USOO5488727A

United States Patent [19]
Agrawal et al.

[11] Patent Number: 5,488,727
[45] Date of Patent: Jan. 30, 1996

[54] METHODS TO SUPPORT MULTIMETHOD FUNCTION OVERLOADING WITH COMPILE-TIME TYPE CHECKING

[75] Inventors: Rakesh Agrawal, San Jose; Linda G. De Michiel, Los Altos; Bruce G. Lindsay, San Jose, all of Calif.

[73] Assignee: International Business Machines Corporation, Armonk, N.Y.

[21] Appl. No.: 771,376

[22] Filed: Sep. 30, 1991

[51] Int. Cl.⁶ .............................. G06F 9/45; G06F 11/00
[52] U.S. Cl. ...................... 395/700; 364/246.3; 364/265; 364/280.4; 364/DIG. 1
[58] Field of Search .................................... 395/650, 700

[56] References Cited

U.S. PATENT DOCUMENTS

| | | | |
|---|---|---|---|
| 4,595,981 | 6/1986 | Leung | 371/19 |
| 4,686,623 | 8/1987 | Wallace | 395/700 |
| 4,694,420 | 9/1987 | Pettet et al. | 371/19 |
| 4,696,003 | 9/1987 | Kerr et al. | 371/19 |
| 4,802,165 | 1/1989 | Ream | 371/19 |
| 4,819,160 | 4/1989 | Tanica et al. | 364/300 |
| 4,827,404 | 5/1989 | Barstow et al. | 395/500 |
| 4,864,569 | 9/1989 | Delucia et al. | 371/19 |
| 4,885,684 | 12/1989 | Austin et al. | 395/650 |
| 4,894,771 | 1/1990 | Kunii et al. | 364/300 |
| 4,937,739 | 6/1990 | Ernst et al. | 364/521 |
| 4,953,084 | 8/1990 | Meloy et al. | 371/19 |
| 5,021,947 | 6/1991 | Campbell et al. | 395/700 |
| 5,093,914 | 3/1992 | Coplien et al. | 395/700 |

OTHER PUBLICATIONS

Lécluse et al., Manipulation of Structured Values in Object Oriented Databases, 1989, The Whole Document.
Lomet, Hardware Assistance For Type Checking, May, 1976.
Beaven, A Functional Language with Classes, 1991, pp. 364-370. Conference Date: 18-20 Oct. 1989.
O'Brien, The Trellis Programming Environment, 1987, Sig Plan Notices vol. 22, No. 12, pp. 91-102.
Shaffert, An Introduction to Trellis/Owl, 1986, Sig Plan Notices vol. 21, No. 11, pp. 9-16.
Lafore, R., The Waite Group's C Programming Using Turbo C⁺⁺, 1990, pp. 667-669.

*Primary Examiner*—Thomas M. Heckler
*Assistant Examiner*—John Q. Chavis
*Attorney, Agent, or Firm*—James C. Pintner; Joseph J. Kaliko

[57] ABSTRACT

Methods and related apparatus, for use in programming language systems, are set forth which support compile-time type checking for overloaded functions in an environment supporting subtypes with multiple inheritance. At both compile and runtime, the invention considers the type of all actual arguments of a function to select a proper function instance to execute. Furthermore, the methods contemplated by the invention identify at compile time the set of function instances which might be invoked due to subtype substitutions for the actual arguments. Since type errors on function invocations or variable assignments are usually indicative of a programming error, program reliability can be improved and faults that would otherwise result in runtime errors can be corrected through the use of the invention prior to program deployment.

10 Claims, 6 Drawing Sheets

METHODS TO SUPPORT MULTIMETHOD FUNCTION OVERLOADING WITH COMPILE-TIME TYPE CHECKING

FIELD OF THE INVENTION

The invention relates generally to methods used in modern programming language systems that support the notion of "typed" data to reduce (or eliminate) runtime errors that can result from a mismatch between declared types of program variables and the types of values assigned to such variables. A data "type" is defined herein to consist of a representation and a set of functions which can be applied to instances of the data type. For example, a "line" may be considered a data type, represented by a pair of points (or some other representation, such as a point, length and a slope), and a function that determines the length of a line is an example of a function that can be applied to "line" type data; a "string" may be considered a data type, represented by a character array, and a function that identifies a given pattern in the array exemplifies a function that can be applied to "string" type data; etc.

More particularly, the invention relates to methods (and related apparatus) for use in such programming language systems to support compile-time type checking for "overloaded functions" in an environment supporting "subtypes" with "multiple inheritance". At both compile time and runtime, the invention considers the types of all "arguments" of a function to select a proper "function instance" to execute. Furthermore, the methods contemplated by the invention identify the set of function instances which might be invoked due to subtype substitutions for the actual arguments.

The terms, "overloaded functions", "subtypes", "multiple inheritance", "actual argument", "function instance", and many other terms well known to those skilled in the art will, for the sake of completeness and clarity, be defined hereinafter as part of the background section of the invention.

BACKGROUND OF THE INVENTION

A number of prior art programming language systems, such as the C++ system, the Ada system, the Modula-3 system, the Smalltalk system, etc., support the aforementioned notion of typed data. As indicated hereinbefore, a data type consists of a representation and a set of functions which can be applied to instances of the data type.

Functions may be thought of as parameterized program fragments which can be invoked (or called) from multiple points in a program. An important consideration in such systems is the correct matching between the declared types of program variables and the types of values assigned to them. Also, the types of the arguments of a function invocation and the argument types expected by the function body which is invoked must be compatible. Incorrect matches between the actual and formal parameters of a function invocation or between variables and their values can lead to unpredictable and incorrect program behavior.

In order to improve program reliability, the type correctness of function invocations and variable assignments can be checked by the programming language system during program preparation (compile-time) or during program execution (runtime). Compile-time type checking is preferred since it can prevent type errors from occurring after the program has been deployed. Additionally, type errors on function invocations or variable assignments are usually indicative of a programming error.

Given a programming language supporting typed data, it is useful to be able to "overload" function names. Function "overloading" allows multiple function instances (or bodies) to be denoted by the same function name. For example, in a programming language having shape types, for example, "circle", "triangle", "rectangle", etc., a function "area" can be defined for each of the shape types. Together, these "area" function instances constitute an overloaded function. The same function name ("area") describes multiple function instances (e.g., area (circle), area (triangle), area (rectangle), etc.) which result in the generation of different code strings and execution sequences at compile and runtimes, respectively.

Processing of invocations of overloaded functions must take into account the number and types of the function arguments at the point of invocation and the number and types of the formal arguments of each instance of the overloaded function to select the proper function instance to be executed.

Recent developments in programming technology, such as the aforementioned C++ systems, the CommonLoops, CLOS system, etc., have extended the semantics of data types to allow one type to be a subtype of one or more preexisting types (also referred to herein as systems that support multiparent subtypes). In addition, instances of a subtype may be substituted or used in contexts declared to use a supertype of the subtype. This means that an instance of a subtype may be assigned to a variable declared to be one of its supertypes, or passed as an actual parameter to a function whose corresponding formal parameter is declared to be one of its supertypes.

In the foregoing example related to the function "area", a new shape "square" illustrates a subtype of the previously existing data type "rectangle". An instance of a square may be substituted or used in contexts declared to use the supertype rectangle in programming language systems which support subtypes (inheritance) and subtype substitutability.

It is well understood by those skilled in the art that substitutability of subtypes, in conjunction with function overloading, implies that a runtime decision among instances of the overloaded function may be required. Runtime selection of the function instance to be executed (also referred to herein as "dynamic dispatch") may consider the type of only one argument or the types of all the actual arguments.

"Selfish" function selection considers the type of only a single, distinguished actual argument at runtime. "Multimethod" function selection considers the types of all actual arguments to select the function instance that most closely matches the actual argument types of the function call.

Existing examples of programming languages which support compile-time type checking, subtypes, function overloading and dynamic dispatch, such as the Trellis/Owl system, C++, etc., are "selfish", i.e., discriminate on only one of the function arguments (at runtime) to choose between instances of an overloaded function. This means that functional behavior for overloaded functions can be conditioned on only one of the function arguments. Thus, for example, if "integer" is a subtype of "float", such systems cannot directly support overloading of a function such as "MAX" with instances $MAX_1$ (integer,integer), $MAX_2$ (float,float), $MAX_3$ (integer,float) and $MAX_4$ (float,integer).

Accordingly, it would be desirable to provide a mechanism (and the invention described herein is such a mechanism) which efficiently supports subtyping (with multiple parent types), function overloading, compile-time type checking, and dynamic dispatch based on utilizing the types of all of the actual arguments (to select the proper function instance to execute).

Such a mechanism should guarantee that (1) every function receives arguments which are subtypes of its formal argument types; (2) at least one applicable function instance exists for every function invocation; (3) the actual result type of any method (function) invocation will be consistent with the context of the invocation; and (4) the set of function instances that might be invoked due to subtype substitutions for actual arguments is identified.

Before proceeding to summarize and then set forth the details regarding the methods and apparatus contemplated by the invention, the terms of art used herein, although well known to those skilled in the art, will be defined for the sake of completeness and clarity. Each of these terms (in quotes) is defined as follows:

"Subtype": If type B is a subtype of type A, then every instance of B is also an instance of A. The subtype relationship "B is a subtype of A" is denoted by $B \leq A$. If $B \leq A$ and $A \neq B$, then B is a proper subtype of A (denoted $B<A$). The subtype relationship is transitive; i.e., $B \leq \wedge C \leq B \Rightarrow C \leq A$. If a subtype is a subtype of more than one type, then that subtype is said to have "multiple inheritance".

"Substitutability": If $B \leq A$, then an instance of B may be used wherever an instance of A may be used. B is substitutable for A because every instance of B is also an instance of A. In particular, if $B \leq A$, then an instance of B may be assigned to a variable declared to be of type A, and instances of B may be passed as arguments of functions whose formal arguments are of type A.

"Function Instance": An executable function instance consists of a function name, a sequence of typed, formal arguments, a result type, and a code body. Function instances are executed with values, specified in the invocation, bound to the arguments. A function instance is denoted by $f_k(T_k^1, T_k^2, \ldots, T_k^n) \rightarrow R_k$, where $f_k$ is the k-th instance of the function named f, $T^j$ is the formal type of the j-th argument, and $R_k$ is the formal result type.

"Function Arity": The number of arguments of a function.

"Overloaded Function": The set of function instances having the same function name and arity.

"Function Invocation": A call to a function embedded in a program. A function invocation is denoted by $f(T^1, T^2, \ldots, T^n)$ where "f" is the function name $T^i$, which is the static type of the i-th argument; i.e., the argument in the i the positive.

"Function Invocation Execution": The performance of a function invocation at runtime. The actual argument types are used, as needed, to select the most specific applicable function instance.

"Formal Argument Type": The type of an argument declared for a function instance.

"Static Argument Type": The declared (or inferred) type of an argument of a function invocation. Static types are determined during compilation using the declared types of variables specified as function invocation arguments or by analysis of expressions specified as function invocation arguments. The static argument type must be a subtype of the formal argument type.

"Actual Argument Type": The type of the argument instance actually bound to a function argument during execution of a function invocation. The actual argument type may differ from one execution of a function invocation to another execution of the same function invocation. The actual argument type must be a subtype of the static argument type.

"Applicable Function Instance": An instance of a function is applicable to a function invocation (or execution of a function invocation) if the function names and arity match, and the static (or actual) type of each argument is a subtype of the corresponding formal argument type. More formally, the function instance $f_k(T_k^1, T_k^2, \ldots, T_k^n)$ is applicable to function invocation $f(T^1, T^2, \ldots, T^n)$ if and only if for every i, $1 \leq i \leq n$, $T^i \leq T_k^i$.

"Consistent with Invocation Context": A function invocation is consistent with the invocation context if (1) there is at least one applicable function instance for its static argument type, and (2) if a function instance can be selected for execution at runtime due to the occurrence of instances of subtypes of any of the static argument types, then, (a) if the result of the function invocation is assigned to a variable, the result type of the function invocation is a subtype of that variable; or (b) if the result of the function invocation passes arguments to an enclosing function invocation, then conditions (1) and (2) both hold for the enclosing invocation.

"Function Instance Confusability": Two function instances are confusable if they are both applicable to some function invocation. Formally, function instances $f_1(T_1^1, T_1^2, \ldots, T_1^n)$ and $f_2(T_2^1, T_2^2, \ldots, T_2^n)$ are confusable if for every i, $1 \leq i \leq n$, there exists a type $T^i$, such that $T^i \leq T_1^i \wedge T^i T_2^i$. Thus, two functions are confusable if there exists a common subtype of the formal argument types at each argument position.

"Confusable Set": A confusable set of methods (function instances) is a maximal set C such that methods $m_i$ and $m_j$ are in C if there are k methods (k could be 0) $m_1, m_2, \ldots, m_k$ such that $m_i$ is confusable with $m_1$, $m_1$ is confusable with $m_2, \ldots,$ and $m_k$ is confusable with $m_j$. If a method is not confusable with any other method, it forms a singleton confusable set. Confusable sets over a set of methods M disjointly partition M. It should be noted that confusability is not transitive.

"Static Type Checking": Checking during program compilation that there exists an applicable function instance for every function invocation and that the result type of every potentially applicable function instance is consistent with invocation context.

"Function Instance Specificity": In order to choose between function instances applicable to a function invocation (or execution of a function invocation), a precedence relationship between confusable function instances is needed to select the function instance that most closely matches the function invocation (or execution of the function invocation). If one function instance has precedence over another, then it is more specific. Several examples of function instance precedence rules will be presented. This invention requires a function precedence rule to order confusable function instances, but it does not depend on which precedence rule is used. Examples include:

(1) "Argument Subtype Precedence": If $f_1(T_1^1, T_1^2, \ldots, T_1^n) \rightarrow R_1$ and $f_2(T_2^1, T_2^2, \ldots, T_2^n) \rightarrow R_2$ are confusable, $f_1$ has argument subtype precedence (and is more specific than $f_2$) if for every i, $1 \leq i \leq n$, $T_1^i \leq T_2^i$ and there exist some j, $1 \leq j \leq n$, such that $T_1^j \neq T_2^j$. Note that argument subtype precedence is sufficient to disambiguate all function invocations in systems which support single inheritance and selfish function selection. However, argument subtype precedence is not sufficient to order all confusable function instances in a system with single inheritance and multimethod function selection.

(2) "Argument Order Precedence": If $f_1(T_1^1,T_1^2,\ldots,T_1^n)\to R_1$ and $f_2(T_2^1,T_2^2,\ldots,T_2^n)\to R_2$ are confusable, $f_1$ has argument order precedence (and is more specific than $f_2$) if there exists some first argument position k, $1\leq k\leq n$, such that $T_1^k<T_2^k$, and for every m, $1\leq m<k$, $T_1^m=T_2^m$. It should be noted that the order of argument significance can be any permutation of the argument order. However, it must be uniform for all the function instances of a confusable set. Furthermore, it should be noted that argument order precedence is sufficient to disambiguate all function invocations in systems with single inheritance and multimethod dispatch. For example, consider a system in which types B<A and D<C, and function instances $f_1$ (A,D) and $f_2$(B,C). The functions $f_1$ and $f_2$ do not have argument subtype precedence, but they do have argument order precedence with $f_2$ preceding $f_1$.

(3) "Global Type Precedence": A partial order over types is established such that subtypes precede their supertypes and any two types $T_1$, $T_2$ such that $T_1 \not< T_2$ and $T_2 \not< T_1$ that have a common subtype are ordered by user directive. More precisely, if A<B, then Index(A)<Index(B) and if C< $\wedge$C<E, then Index(D)<Index(E $\vee$Index(E)<Index(D). If $f_1(T_2^1,T_1^2,\ldots,T_1^n)\to R_1$ and $f_2(T_2^1,T_2^2,\ldots,T_1^n)\to R_2$ are confusable, $f_1$ has global type precedence (and is more specific than $f_2$) if there exists some first argument position k, $1\leq k\leq n$, such that Index($T_1^k$)<Index($T_1^k$), and for every m, $1\leq m\leq k$, $T_1^m=T_2^m$. Note that global-type precedence is sufficient to disambiguate all function invocations in systems with multiple inheritance and multimethod dispatch. For example, consider a system with types $C\leq A$ and $C\leq B$, and A is (user) specified to precede B. Given function instances $f_1$ (C,A) and $f_2$ (C,B), $f_1$ precedes $f_2$ due to global-type precedence because A precedes B in the global-type ordering.

It should be noted that users must define the ordering between inherited (parent) types when a subtype is defined. The ordering must be consistent with any previously established orderings.

(4) "Inheritance Order Precedence": Let $f_1(T_1^1, T_1^2,\ldots,T_1^n)\to R_1$ and $f_2(T_2^1,T_2^2,\ldots,T_2^n)\to R_2$ be function instances applicable to the function invocation $f(T^1,T^2,\ldots,T^n)\to R$. Furthermore, assume that $f_1$ and $f_2$ are not ordered by argument subtype or argument order precedence. Then, let there be a first argument position k, such that $T_1^k \not< T_2^k$ and $T_2^k \not< T_1^k$. However both $f_1$ and $f_2$ are applicable to function invocation f because $T^k\leq T_1^k$ and $T^k\leq T_2^k$. This can occur when $T^k$ (or some ancestor type) multiply inherits from $T_1^k$ and $T_2^k$. Inheritance order precedence orders the supertypes of a type such that for every pair of supertypes, $T_a$ and $T_b$ of a type T, $T_a<T_b$ or $T_b<T_a$ with respect to type T. This order can be specified by the user when type T is created, or the order can be inferred from the lexical order of immediate supertypes given in the specification of type T. (Note that specification of a type with an inheritance order incompatible with the inheritance order of the inherited types must be disallowed.) Inheritance order precedence can be defined as follows: $f_1$ has inheritance order precedence over $f_2$ with respect to invocation f at argument position k if $T_1^k<T_2^k$ with respect to type $T^k$. For example, consider the types C<A, C<B, D<A, and D<B. Also, let the inheritance order be A<B with respect to type C and B<A with respect to type D. Now, the function instances $f_1$(A) and $f_2$(B) are both applicable to a function invocation f(C). Note that $f_1$ and $f_2$ have neither argument subtype precedence, nor argument order precedence. However, $f_1$ has inheritance order precedence for the invocation f(c) because type C inherits from type A before it inherits from type B.

"Most Specific Applicable Function Instance": Given a precedence order among the function instances applicable to a function invocation (or execution of a function invocation), the most specific applicable function instance is the function instance having highest precedence. The most specific applicable function instance of a (static) function invocation is the least specific applicable function that may be executed by that invocation. This follows from the fact that the actual argument types of function invocation must be subtypes of the static argument types.

"Potentially Applicable Function Instance": A function instance is potentially applicable to a function invocation if it is the most specific applicable function instance or is more specific than the most specific applicable function instance and is confusable with the function invocation.

"Function Instance Consistency": Two function instances are consistent if they are not confusable. Otherwise, if $f_1(T_1^1,T_1^2,\ldots,T_1^n)\to R_1$ and $f_2(T_2^1,T_2^2;\ldots,T_2^n)\to R_2$ are confusable, they are consistent if: there exists k such that $T_1^k \neq T_2^k$, and if $f_1$ has precedence over $f_2$ then $_1\leq R_2$, and if $f_2$ has precedence over $f_1$ then $R_2\leq R_1$. It should be noted that in the case of Inheritance Order Precedence, $f_1$ may be both more and less specific than $f_2$ and therefore the result types $R_1$ and $R_2$ must be the same.

Having rigorously defined the terms of art used herein, the invention may now be described with reference to these terms. First, however, it should be recognized that several concepts related to the invention are described or alluded to in recent publications, although no one reference or combination of references is known which describes any one mechanism or set of mechanisms which have the desirable characteristics as outlined hereinbefore.

In particular, an article by Lécluse and Richard entitled "Manipulation of Structured Values in Object-oriented Databases", appearing in the Proceedings of the Second International Workshop On Database Programming Languages (published in 1989), alludes to multimethod dispatch; however, no specific mechanism or procedure is set forth for checking that an applicable method exists. Also missing from this reference is the recognition that procedures and data structures for separating the methods of overloaded functions into confusable sets is, as will be demonstrated hereinafter, a key to solving the problem of being able to provide mechanisms and procedures of the type contemplated by the invention.

An article by P. Dussud, entitled "TICLOS: An Implementation of CLOS for the Explorer Family", OOPSLA (1989), as well as an article by Kiczales and Rodriguez, entitled "Efficient Method Dispatch in PCL", presented at the Conference on Lisp and Functional Programming (1990), describe procedures for dispatching multimethod generic functions. However these articles do not discuss compile-time type checking or the novel application of the concepts of confusability and potentially applicable methods which are demonstrated hereinafter to be utilized in realizing the methods contemplated by the invention.

Most recently, Mugridge, Hammer, and Hosking, in an article entitled "Multi-methods in a Statically-Typed Programming Language", Report No. 50, published by the Department of Computer Science, University of Auckland (1991), although describing the notion of "Potentially Applicable Functions" under the rubric "relevant variants", and the notion of a runtime dispatch for the "relevant variants", fails to describe procedures for identifying the confusable set of a function invocation and fails to teach or even suggest how to obtain and exploit a total ordering of confusable methods (i.e., method precedence rules). Again, the use of confusable sets, a total ordering of confusable methods, etc., will be demonstrated as part of the solution, in accordance with the teachings of the invention, to achieve the aforementioned desirable mechanisms and procedures which support multimethod function overloading with compile-time type checking.

SUMMARY OF THE INVENTION

Accordingly, it is an object of the invention to provide methods (and related apparatus), for use in programming language systems, which efficiently support subtyping (with multiple parent types), function overloading, and compile-time (static) type checking. The aforesaid methods and apparatus should support dynamic dispatch based on the utilization of all of the actual arguments types (to select the proper function instance to execute).

Furthermore, it is an object of the invention to provide methods (and related apparatus), for use in programming language systems, which identify the set of function instances that might be invoked due to subtype substitutions for actual arguments.

It is an object of the invention to provide methods (and related apparatus), for use in programming language systems, which guarantee that every operation receives operands of the correct type and that every function invocation has at least one applicable function instance.

It is still a further object of the invention to provide methods (and related apparatus), for use in programming language systems, which guarantee that the actual result type of any method (function) invocation will be consistent with the invocation context.

Further yet, it is an object of the invention to provide methods (and related apparatus), for use in programming language systems, which improve program reliability by preventing type errors from occurring after a program has been deployed.

According to the invention, it is assumed that a programmer, type definer, etc., has created a set of type definitions (including specification of subtype relationships), function (method) definitions, end precedence rules (if not inherently contained in the programming language system itself) for ordering confusable function instances for a given set of arguments; and that these definitions and rules serve as inputs to the programming language system in which the invention is implemented.

In accordance with one aspect of the invention, these inputs are processed to prepare for the static type checking of function invocations and ultimate determination of which instance of an overloaded function to call. This preparation process can take place independently with respect to the compilation process or be incorporated into the compilation process per se via a method comprising the steps of: (a) creating, from the input type definitions, a first data structure for representing subtype relationships between data types; (b) storing said first data structure; (c) creating, from the input function definitions, precedence rules and said first data structure, a partitioning of function instances into confusable sets; (d) ordering the function instances within each confusable set; (e) verifying consistency among the ordered function instances; (f) storing the ordered function instances for each confusable set; (g) extracting, for each confusable set, information as to what the maximal static argument types of the functions are for each formal argument position; and (h) storing the identified maximal types for later use during the compilation process.

Obvious variants of the aforestated method, such as methods which replace the step of "storing" with "outputting" a set of values and/or immediately using (instead of storing) such values, etc., are all contemplated by the invention.

Following the performance of steps (a)–(h) set forth hereinabove (the aforementioned preparation process), the invention contemplates performing a method (at compilation time) which takes as input a source program together with the results of performing the static-type checking preparation process, i.e., the aforesaid first data structure, ordered function instances for each confusable set, and identified maximal types, comprising the steps of: (1) efficiently selecting confusable sets that are potentially associated with a function invocation based on said identified maximal types; (2) determining from the selected confusable sets identified in step (1) the most specific applicable function instance for the static argument types of the function invocation; (3) checking that the result type of that function instance is consistent with the static invocation context in which it occurs; (4) identifying potentially applicable function instances (i.e., function instances that might be invoked at runtime instead of the most specific applicable function instance for the static argument types as determined in step (2)) called due to allowable substitutions of subtype instances as actual arguments; and (5) creating a second data structure (e.g., a decision table) for the function instances identified in the previous step which may be utilized at the time of execution of the program,to facilitate dynamic selection of the most applicable function instance for the types of actual arguments of the invocation.

According to a further aspect of the invention, the aforementioned processes (process steps (a)–(h) and process steps (1)–(5)) may be practiced separately, may be combined into a single process, and/or may also be combined with yet another method step (which may be practiced separately in accordance with yet another aspect of the invention) to fully realize the aforestated objects. This further step involves selecting the most specific applicable function instance for the types of actual arguments of the invocation (dynamically at runtime) and executing that function instance. This last step is typically performed after the compilation phase is complete, in a program execution module which may be located either within or outside the programming language system per se.

Steps (a)–(h) are performed once for a given set of types, function instances, and precedence rules. As indicated hereinabove, steps (1)–(5) are performed during compilation of a function invocation and the aforementioned last step is performed during execution of a function invocation, at runtime. It should be noted that this last step may, according to one embodiment of the invention, be unnecessary and eliminated when only one function instance is potentially applicable.

According to the teachings of the invention, the "confusable sets" group together with the instances of an overloaded function might be invoked at runtime in response to a function invocation due to permissible subtype substitutions for the actual parameters of the invocation. Several distinct confusable sets may be associated with a single overloaded function. However, only one of these confusable sets will contain the function instances that are applicable to the static (compile-time) types of a given function invocation. The method used in step (1) to efficiently select among these several confusable sets of an overloaded function leads to good performance in determining the potentially applicable function instances.

With reference to the prior art, the use of confusable sets to partition sets of overloaded function instances is new and leads to efficient compile-time identification of the function instances which are potentially applicable to a function invocation.

The notion and mechanism of the top-types of a confusable set is also novel and is introduced to further accelerate the selection of the confusable sets that may contain function instances applicable to a function invocation.

The use of a function precedence order and the extension of that partial order to a total order over a confusable set further refines the search for applicable function instances during compile and at runtime.

The invention describes mechanisms (methods and apparatus) that can be used to implement a programming language environment that supports all of the following features:

(1) Compile-time Type Checking: ensuring, during program compilation, that an applicable function instance exists for every function invocation in the program and that the result type of every function instance that might be called, at runtime, is consistent with the invocation context;

(2) Multiparent Subtypes: subtype instances, supporting the behavior of multiple parent types, may appear at runtime anywhere that any of their ancestor types are expected without violating the type correctness of the program;

(3) Overloaded Functions: several instances of a given function (name) may be defined subject only to consistency rules and the existence of a precedence order between confusable function instances;

(4) Runtime Function Selection: the function instance executed at runtime is selected using the types of the actual arguments from the potentially applicable functions which is a smaller set of functions than the entire confusable set or the even larger generic set of functions (where the actual argument types may be subtypes of the static argument types); and (5) Multimethod Function Dispatch: the selection of the function instance to be executed depends on the types of all of the actual arguments.

This invention describes mechanisms and methods for achieving all of the above features by analyzing, organizing, checking, and choosing function instances.

The key mechanism of function instance confusability is used to organize function instances. The organizing principle of function confusability leads to efficient mechanisms for locating the function instances applicable to a function invocation using the top-types construct to characterize the membership of a confusable set.

Additionally, the use of function precedence order rules will be shown to be useful in efficiently searching for applicable function instances, both within a confusable set at compile time, and among the potentially applicable function instances at runtime.

These and other objects and features of the invention will be recognized by those skilled in the art upon reviewing the detailed description set forth hereinafter in conjunction with the accompanying drawing.

DETAILED DESCRIPTION

Figure 1:
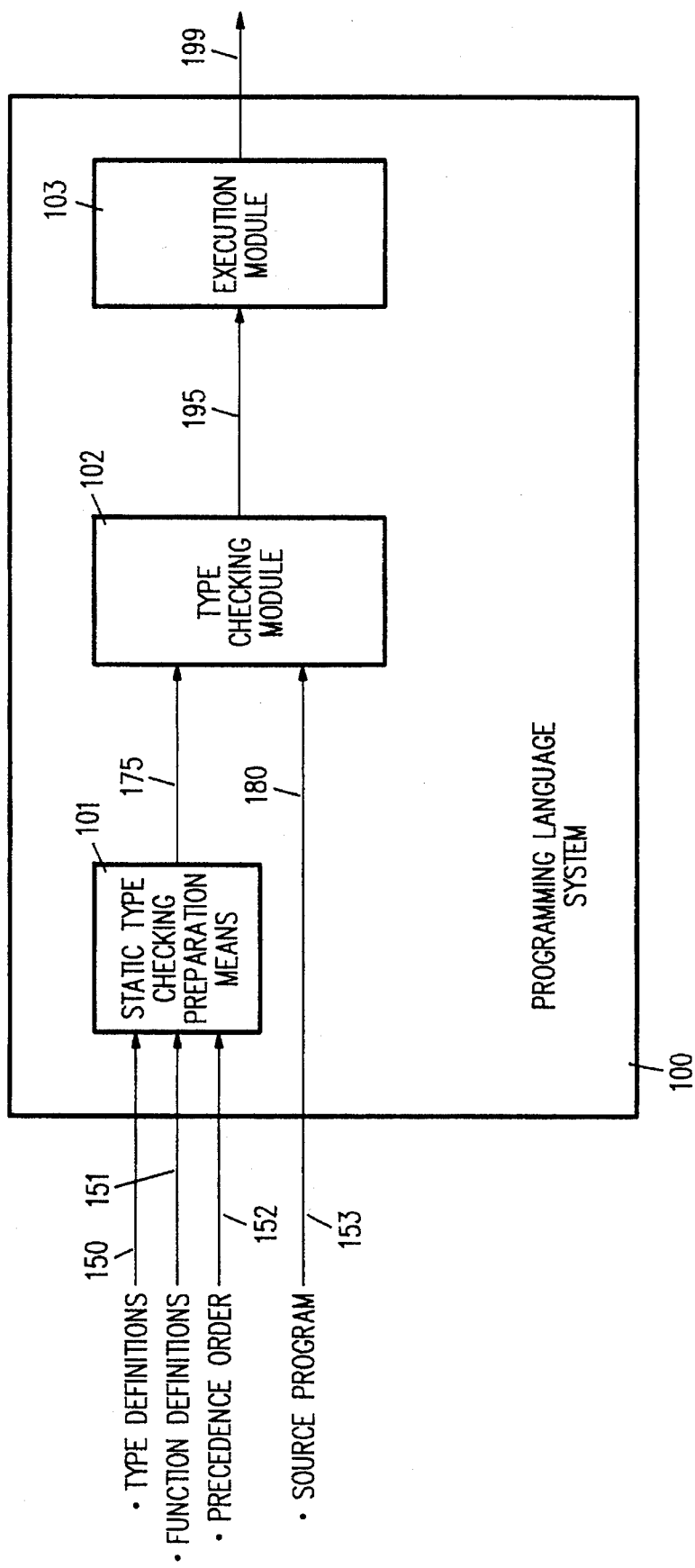
FIG. 1 is a block diagram representation of a programming language system in which the invention may be implemented.

FIG. 1 is a block diagram representation of a programming language system in which the invention may be implemented and practiced. The illustrative programming language system depicted in FIG. 1, programming language system 100 (PLS 100), is shown to include static-type checking preparation means 101, type checking module 102, and execution module 103.

PLS 100 is presented for the sake of illustration only. Those skilled in the art will readily appreciate that, for example, execution module 103 (or its equivalent) could be located apart from the programming language system per se; static-type checking preparation means 101 and type checking module 102 could be combined in a compiler within PLS 100; static-type checking means 101 could be eliminated altogether if the output of means 101 (to be described in detail hereinafter) were presented as a data set to type checking module 102, etc.

In FIG. 1, static-type checking preparation means 101 is shown receiving the following inputs: (1) a predefined set of type definitions; (2) a predefined set of function definitions; and (3) the precedence ordering information referred to hereinbefore, via illustrative input links 150–152, respectively, as shown in FIG. 1.

Located within static-type checking preparation means 101, but not explicitly depicted in FIG. 1, are means for performing the aforementioned "preparation process" for the static-type checking of function invocations, namely: (a) creating, from the input-type definitions, a first data structure for representing subtype relationships between data types; (b) storing said first data structure; (c) creating, from the input function definitions, precedence rules, and said first data structure, a partitioning of function instances into confusable sets; (d) ordering the function instances within each confusable set; (e) verifying consistency among the ordered function instances; (f) storing the ordered function instances for each confusable set; (g) extracting, for each confusable set, information as to what the maximal static argument types of the functions are for each formal argument position; and (h) storing the identified maximal types for later use during the compilation process.

The collective outputs available at the completion of these method steps, i.e., the stored first data structure, ordered function instances for each confusable set, and identified maximal types, are shown in FIG. 1 as inputs to type-checking module 102, together with the source program being compiled, via links 175 (for the collective outputs of static-type checking preparation means 101) and link 180.

According to the illustrative embodiment of the invention being presented with reference to FIG. 1, type-checking module 102 includes means for performing the following steps: (1) efficiently selecting confusable sets that are potentially associated with a function invocation based on said identified maximal types; (2) determining from the selected confusable sets identified in step (1) the most specific applicable function instance for the static argument types of the function invocation; (3) checking that the result type of that function instance is consistent with the static invocation context in which it occurs; (4) identifying potentially applicable function instances (i.e., function instances that might be invoked at runtime instead of the most specific applicable function instance for the static argument types as determined in step (2)), called due to allowable substitutions of subtype instances as actual arguments; and (5) creating a second data structure (e.g., a decision table) for the function instances identified in the previous step which may be utilized at the time of execution of the program to facilitate dynamic selection of the most applicable function instance for the types of actual arguments of the invocation.

Furthermore, according to the illustrative embodiment of the invention being presented with reference to FIG. 1, the aforementioned second data structure is shown as being input to execution module 103, via link 195, where it is used (at the time of program execution) to facilitate dynamic selection of the most applicable function instance for the types of actual arguments of the function invocation. As indicated hereinbefore, this last step is typically performed after compilation is complete in a program execution module which may be located either within or outside the programming language system per se. Link 199 leaving PLS 100 from execution module 103 is shown to represent an object code output path from PLS 100.

The methods implemented at each of the blocks shown in FIG. 1 will be described in detail hereinafter with reference to the flowcharts presented in FIGS. 6A–6B, following a brief overview of the functions performed by the invention over time (discussed with reference to FIG. 2) and several examples presented with reference to FIGS. 3A–3B, 4, and 5 which help explain the concepts of type, subtype, cyclic relationships, and consistency checking for the purpose of preventing runtime errors and the notion of confusability.

Figure 2:
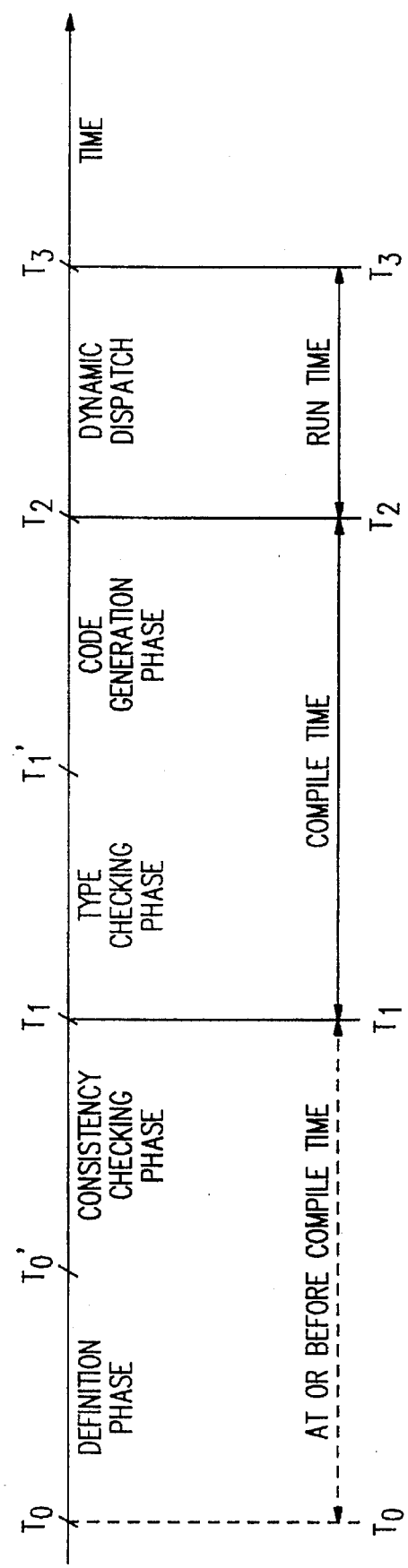
FIG. 2 depicts, in the form of a timeline, the definition phase, consistency checking phase, type checking phase, and code generation phase of preparing a program for execution, and the dynamic dispatch phase during which a program is actually run. Each of the aforementioned phases represents a period of time during which at least one of the method steps contemplated by the invention may be practiced.

FIG. 2 depicts, in the form of a timeline, the definition phase, consistency checking phase, type checking phase, and code generation phase of preparing a program for execution, and the dynamic dispatch phase during which a program is actually run. Each of the aforementioned phases represents a period of time during which at least one of the method steps contemplated by the invention may be practiced.

In particular, steps (a)–(h) of the preparation process set forth hereinabove are, according to one embodiment of the invention, preformed prior to compilation time (which starts at time $T_1$ in FIG. 2) between times $T_0$ and $T_1$ shown in FIG. 2. As indicated hereinbefore, the illustrative static-type checking preparation means 101 (shown in FIG. 1 and to be described in more detail hereinafter) may be used to perform these steps.

Steps (a) and (b) are, for the sake of illustration, assumed to be performed during the "definition" phase, shown as time interval $T_0$–$T_0'$ in FIG. 2. Steps (c)–(h) of the preparation process are, for the sake of illustration, performed during time interval $T_0'$–$T_1$, where interval $T_0'$–$T_1$ is referred to as the "consistency checking" phase of the invention in FIG. 2.

The compilation process illustrated with reference to FIG. 2 spans time interval $T_1$–$T_2$. During this time interval, the illustrative compiler accepts a source program together with inputs from the depicted definition and consistency checking phases. These inputs have been described hereinbefore (maximal types, etc.).

The "type checking" phase depicted in FIG. 2 is an exemplary time interval during which steps (1)–(3) set forth hereinbefore may be practiced by illustrative type-checking module 102 ( shown in FIG. 1).

The "code generation" phase depicted in FIG. 2 (occurring during time interval $T_1'$–$T_2$) is the illustrative time interval over which the compiler actually generates object code assuming the input source program meets the static type checking criteria established by the methods contemplated herein (e.g., being able to identify at least one confusable set associated with the invocation of an overloaded function, determining that a most specific applicable function instance of an identified confusable set exists (using the static types of the function invocation) and is consistent with the context of the function invocation, etc.). The objective of this phase is to identify the function instances that might be invoked at runtime, called due to allowable substitutions of subtype instances as actual arguments, and to create a second data structure (for example, a decision table) for the function instances so identified, to be used at the time of execution of the program to facilitate dynamic selection of the most applicable function instance for the types of the actual arguments of the invocation. Also, errors are identified and flagged if the aforementioned criteria are not met.

The code generation phase is the time period during which, according to the illustrative embodiment of the invention being described herein, steps (4) and (5) of the type-checking method set forth hereinbefore may be practiced.

FIG. 2 also depicts the "dynamic dispatch" phase of the invention which may be practiced in combination or independently with respect to the aforestated methods. The aforementioned step of selecting the most specific applicable function instance for the types of actual arguments of the invocation (dynamically at runtime) and executing that function instance is, according to one embodiment of the invention, practiced during the dynamic dispatch phase occurring during time interval $T_2$–$T_3$ as shown in FIG. 2. As previously indicated, this step is typically performed after the compilation phase is complete in a program execution module which may be located either within or outside the programming language system per se.

Having described an exemplary programming language system in which the invention may be implemented and having given a time-oriented frame of reference for practicing the methods contemplated by the invention, attention is directed to FIGS. 3A–3B, 4, and 5 which, as indicated hereinbefore, may be useful in explaining the principles of consistency checking, the notion of confusability, and the general utility of the invention in preventing runtime errors.

Figure 3A:
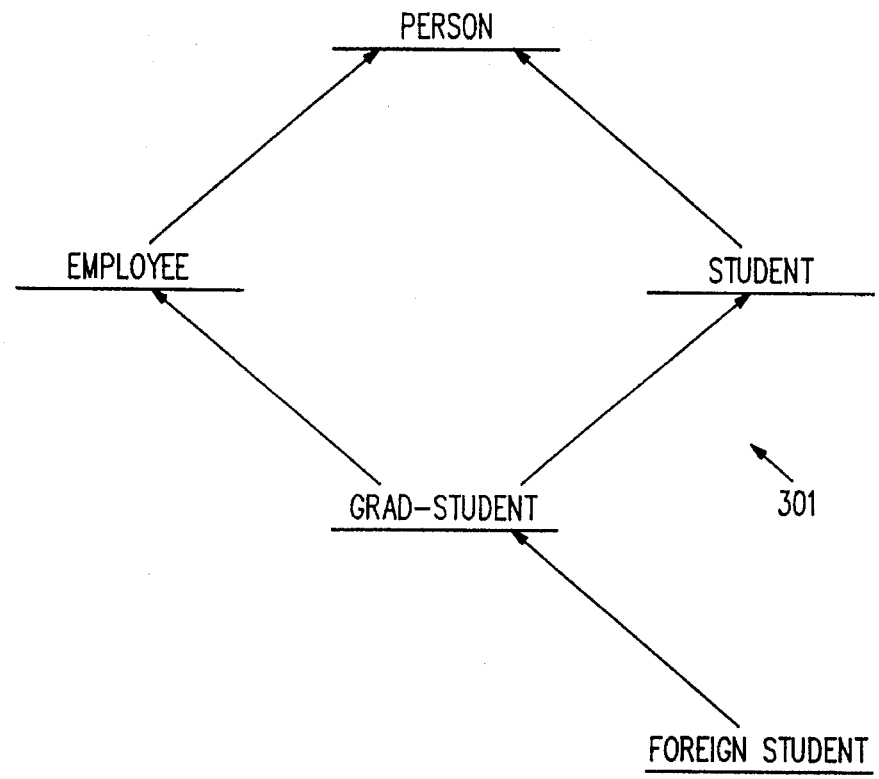
FIGS. 3A–3B depict graphs which illustrate several concepts that are useful in understanding the principals of the invention. In particular, the concepts of type, subtype, and acyclic relationships are explained with reference to FIGS. 3A–3B.
Figure 3B:
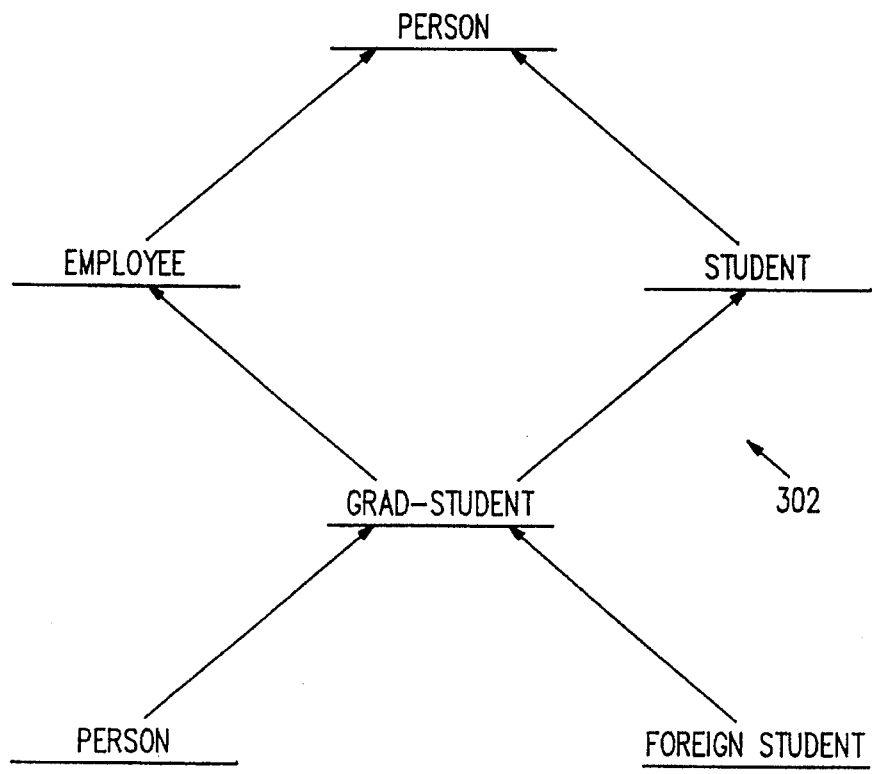

FIGS. 3A–3B depict graphs which illustrate the concepts of type, subtype, and (forbidden) cyclic relationships. It is well known that type relationships can be represented by directed acyclic graphs. In FIG. 3A, one such graph, 301, is shown with "person" being a data type having "employee" and "student" as subtypes. Further down the hierarchical structure represented by directed acyclic graph 301 are subtypes "grad-student" (a subtype of both "student" and "employee") and "foreign student", defined as a subtype of "student".

Based on the definition of subtype as set forth hereinbefore, it is clear that every "employee" is a "person"; every "student" is a "person"; every "grad-student" is both an "employee" and a "student"; and that every "foreign student" is a "grad-student".

The type/subtype relationships defined in graph 301 of FIG. 3A represent the kind of information provided to static-type checking preparation means 101 shown in FIG. 1, from which the aforementioned first data structure can be created using techniques well known to those skilled in the art. Thus, step (a) of the previously described preparation process is essentially "old". An example of a published technique for realizing step (a) of the preparation process will be discussed hereinafter with reference to the description of the flowchart depicted in FIG. 6A.

An example of a relationship that would cause a type consistency error to be flagged by the invention (during the aforesaid consistency checking phase) is depicted in FIG. 3B. Here a "cyclic" relationship is shown in graph 302. In particular, graph 302 has "person" defined as a subtype of itself. Such a relationship is considered illegal since it would not support creating the second data structure needed to make dynamic dispatch decisions as called for by the invention. According to a preferred embodiment of the invention, this type of error would be identified and flagged during the consistency checking phase depicted in FIG. 2.

Figure 4:
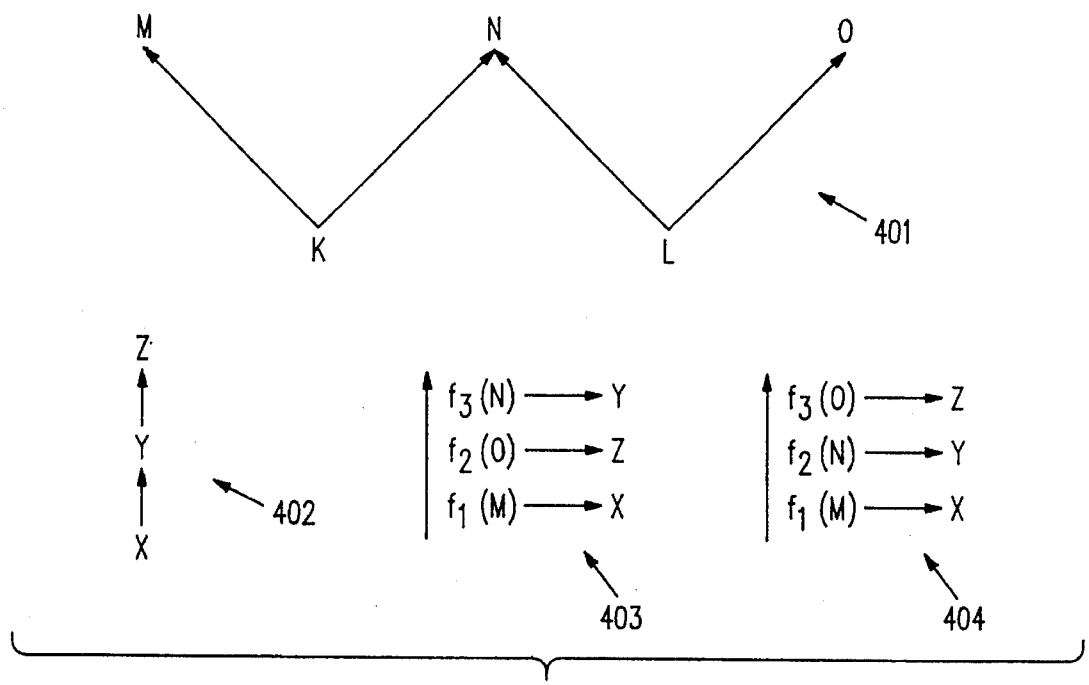
FIG. 4 illustrates a specific type of consistency problem which the invention is designed to identify and flag to prevent runtime errors. In particular, a comparison between a set of consistent and inconsistent type, function, and precedence relation definitions is made with reference to FIG. 4.

Reference should now be made to FIG. 4 for an illustration of another type of consistency problem which the invention is designed to identify and flag to prevent runtime errors; namely, errors resulting from inconsistencies in the definition of type, function, and precedence relations input into a programming language system.

FIG. 4 depicts a type definition (via directed acyclic graph 401) in which K is a subtype of both M and N, and L is a subtype of both N and O. Also depicted in FIG. 4 is another graph, 402, reflecting the definition of X as a subtype of Y and Y being a subtype of Z.

Overloaded function f is depicted in table 403 of FIG. 4. The instances of f, $f_1(M) \rightarrow X$, $f_2(O) \rightarrow Z$, and $f_3(N) \rightarrow Y$ form a confusable set in that the formal arguments of $f_1$ and $f_3$ have a common subtype (i.e., K) and the formal arguments of $f_3$ and $f_2$ have a common subtype (i.e., L). It should be noted that confusability is not transitive in that the formal arguments of $f_1$ and $f_2$ share no common subtype. A sample precedence ordering of these function instances is represented by the upgoing arrow shown along side table 403 in FIG. 4. As a result of the precedence ordering shown along side table 403, the result types are inconsistent with the definition of the type hierarchy depicted in graph 402 in which Y is a subtype of Z. Accordingly, the invention identifies and flags (during the consistency checking phase depicted in FIG. 2) the definitions contained in graphs 401, 402 and table 403, as inconsistent in order to avoid runtime errors.

An alternate definition and precedence ordering for function f is defined in table 404. According to table 404, $f_1(M) \rightarrow X$, $f_2(N) \rightarrow Y$, and $f_3(O) \rightarrow Z$. Clearly with this set of definitions (graphs 401 and 402 together with table 404) there is no consistency problem between the results of functions $f_1$, $f_2$, or $f_3$ and the type definition input to the programming language system in which the invention is implemented.

Figure 5:
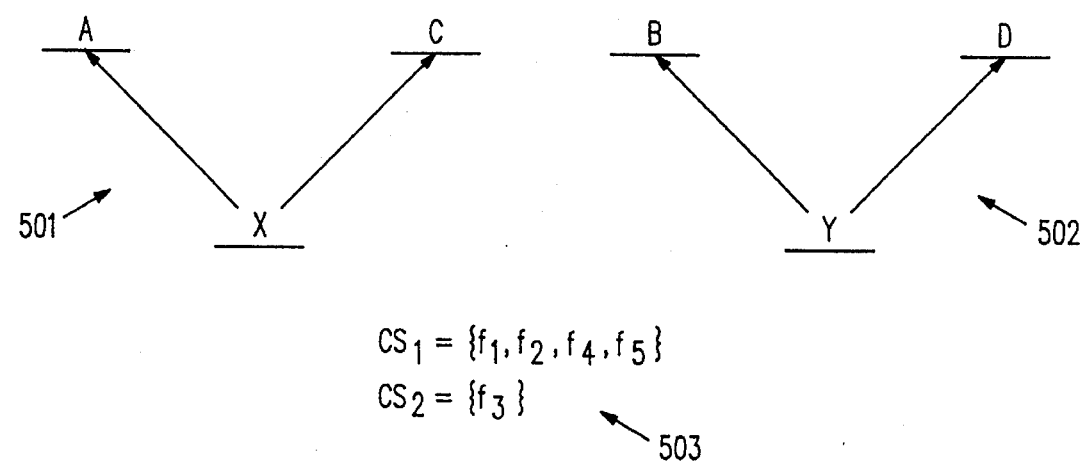
FIG. 5 illustrates the notion of confusability and partitioning instances of an overloaded function into confusable sets as contemplated by the invention.
Figure 6A:
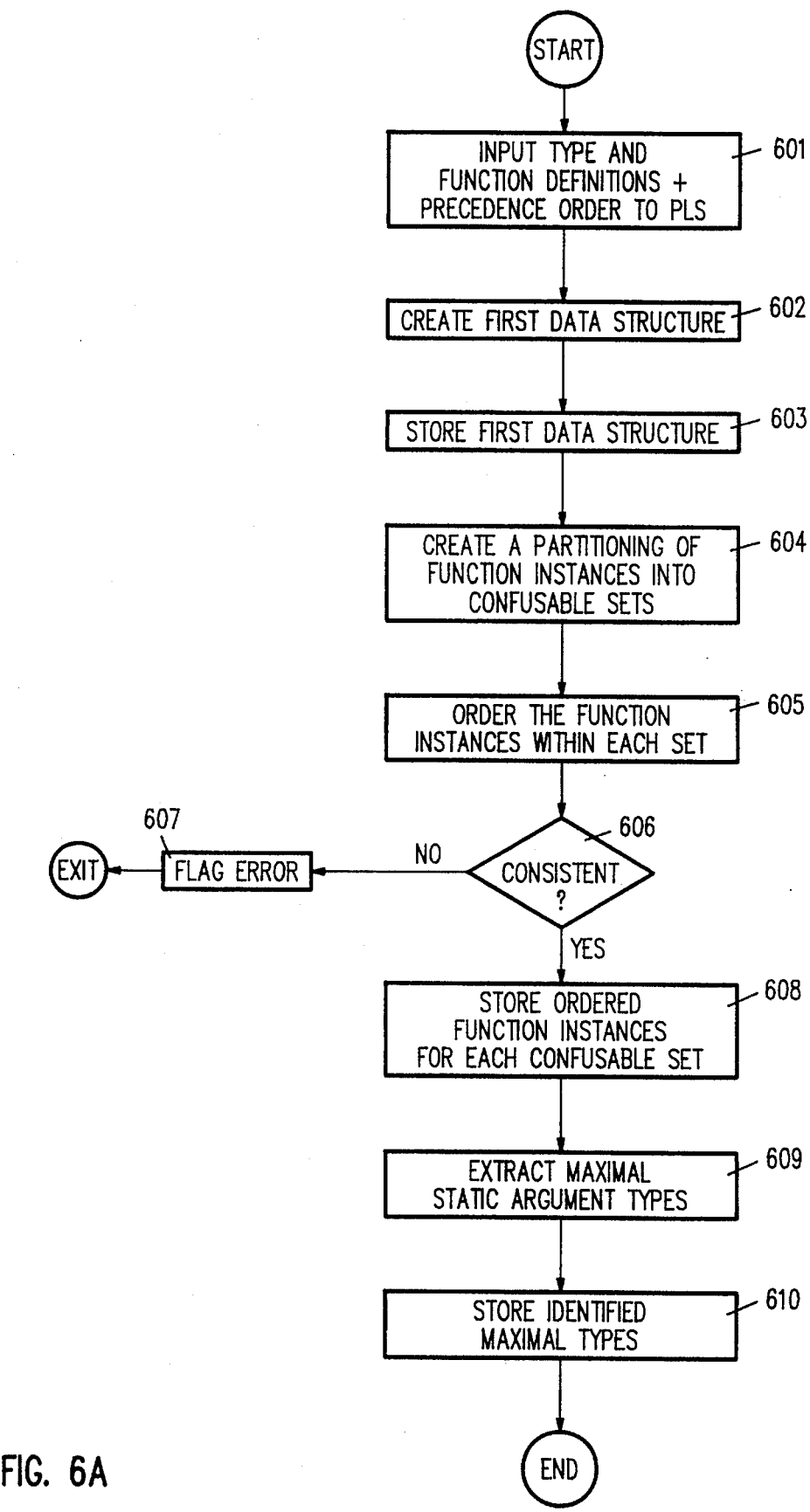
FIGS. 6A–6B are flowchart representations of the method steps called for in one embodiment of the invention to realize the objects set forth hereinbefore.
Figure 6B:
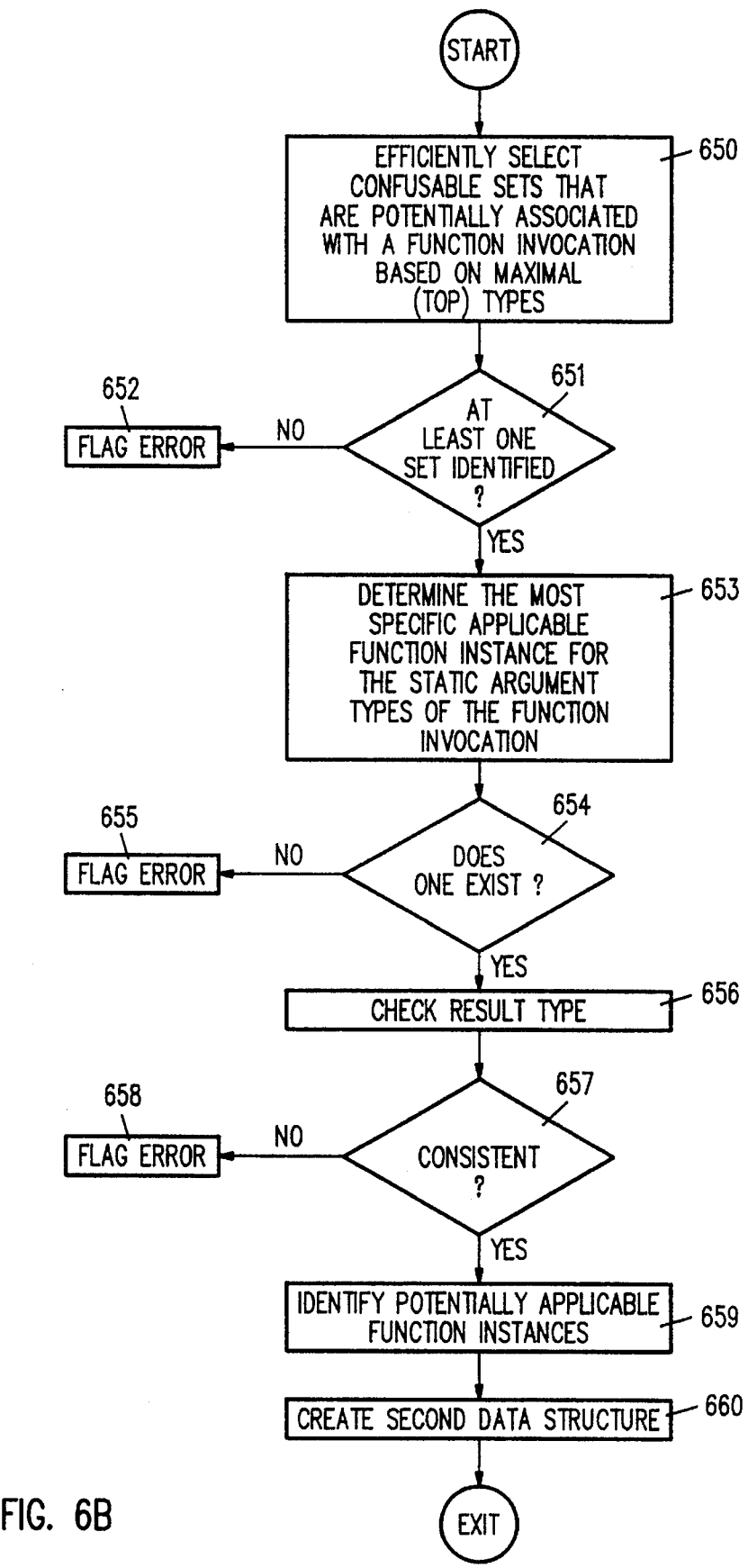

Before turning to the flowcharts in FIGS. 6A–6B and the accompanying description of how to implement an illustrative set of method steps which can be used to realize one embodiment of the invention, reference should be made to FIG. 5 where another concept worthy of explanation by example, the notion of confusability and partitioning instances of an overloaded function into confusable sets as contemplated by the invention, is explained.

FIG. 5 illustrates the notion of confusability and partitioning instances of an overloaded function into confusable sets with reference to two graphs, graph 501 and graph 502. Graph 501 indicates that "x" is a subtype of both "a" and "c"; graph 502 indicates that "y" is a subtype of both "b" and "d".

Given overloaded function f with instances $f_1(a,b)$, $f_2(c,d)$, $f_3(a,c)$, $f_4(a,d)$, and $f_5(x,y)$, together with the definitions of a confusable set and overloaded function as presented hereinbefore, it is clear that the following pairs of function instances are confusable: $[f_1, f_2]$, $[f_1, f_4]$, $[f_1, f_5]$, $[f_2, f_4]$, $[f_2, f_5]$, and $[f_4, f_5]$. Also, it is clear that $f_3$ is not confusable with any of the other four function instances. Table 503 in FIG. 5 shows that function instances $f_1$, $f_2$, $f_4$, and $f_5$ form one confusable set, i.e., $CS_1$; while function instance $f_3$ forms a second confusable set, i.e., $CS_2$.

As indicated hereinabove and as will be explained in further detail hereinafter with reference to specific pseudocode which may be used to implement the invention, the concept of partitioning instances of an overloaded function into confusable sets (illustrated by way of example with reference to FIG. 5) is a key meeting the objectives of the invention.

The methods implemented at each of the blocks shown in FIG. 1 will now be described in detail with reference to the flowcharts presented in FIGS. 6A–6B.

The set of method steps depicted in FIGS. 6A–6B, explained in detail hereinafter, is but one embodiment of the invention which realizes the objects set forth hereinbefore. The way in which this embodiment may be implemented is described with reference to pseudocode for the sake of illustration and convenience. Any type of hardware, software, or combination of hardware and software that functions to perform the particular method steps (or their equivalent) as set forth in the claims is intended to be within the scope of the invention, notwithstanding the particular implementation set forth hereinafter.

With reference to FIG. 6A, it can be seen that in accordance with a preferred embodiment of the invention, the first part of the "preparation process" contemplated by the invention takes the three inputs shown in block 601 (namely, the type and function definitions, together with a predefined precedence order), creates the first data structure referred to hereinbefore (as shown in block 602), and stores the first data structure as indicated at block 603 of FIG. 6A.

The processing sequence represented by blocks 601-603 (steps (a)–(b) of the aforesaid preparation process) may, as indicated hereinbefore, be implemented by prior art techniques for describing type hierarchy.

Ultimately, the determination of which function instances are applicable to a function invocation and the selection of a specific function instance to invoke at runtime depends on testing whether one type is a subtype of another. The determination of whether function instances are confusable depends on testing whether a pair of types has a common subtype.

In order to efficiently make these determinations, the aforesaid preparation process used in a preferred embodiment of the invention relies on a materialization of the transitive closure of the subtype relationship.

The "compressed transitive closure" technique taught by Agrawal, Borgida, and Jagadish in an article entitled "Efficient Management of Transitive Relationships in Large Data and Knowledge Bases", appearing in the Proceedings of ACM SIGMOD 89 (1989), as well as other prior art techniques for representing a transitive closure, can be employed to create the first data structure referred to at block 602 in FIG. 6A. The Agrawal et al. article is hereby incorporated by reference.

Using the Agrawal technique, an index and a set of ranges are associated with each type. If the index of one type falls into the range of another type, then the first type is a subtype of the second type. Furthermore, if the ranges associated with two types overlap, then the two types have common subtypes in the overlapping range. Using the technique taught in the Agrawal et al. reference leads to logarithmic time to locate types (determine their index and ranges) and, essentially, constant time to test subtype relationships.

Next, with reference to blocks 604–610 of FIG. 6A, steps (c)–(h) of the aforesaid preparation process may be explained in detail. First, a process for partitioning function instances into confusable sets is described, followed by a description of techniques for the ordering of functions of a confusable set and characterizing a confusable set to efficiently determine whether it may contain function instances applicable to a function invocation.

Given a set of function instances, one can partition the function instances into sets of overloaded functions. All function instances with the same function name and argument arity fall into the same set of overloaded function instances. Next, each set of overloaded functions can be partitioned into confusable sets of function instances.

Recalling the definition of confusable functions, the following pseudocode describes the function "ComputeConfusableSets" which, given a set of overloaded function instances, returns the corresponding set of confusable sets. This code can be used to effectively implement step (c) of the aforesaid preparation process (i.e., the step taking place at block 604 of FIG. 6A).

```
ComputeConfusableSets(Overloaded) returns ConfusableSets
    ConfusableSets ← Λ
    do ∀fcn ε Overloaded
        fcnCs ← fcn -- fcnCS accumulates the confusable set of fcn
        do ∀CS ε ConfusableSets
            InThisCS ← False
            do ∀CS_fcn ε CS while ¬InThisCS
                if ∀n, 1≤n≤fcn.arity,∃T_n,T_n≤CS_fcn.ArgType[n]
                    ΛT_n≤fcn.ArgType[n]
                    -- fcn is confusable with CS_fcn
                    -- → add CS to fcnCS and remove from ConfusableSets
                    InThisCS ← True
                    fcnCS ← fcnCS ∪ CS
                    ConfusableSets ← ConfusableSets − CS
        -- add fcnCS to ConfusableSets
        ConfusableSets ← ConfusableSets + fcnCS
```

In order to test for function instance consistency and to facilitate calculation of the most specific applicable function instance of a function invocation, the function instances of a confusable set are ordered (corresponding to step (d) of the aforesaid preparation process as shown taking place at block 605 of FIG. 6A) prior to processing function invocations. However, the ordering of a confusable set may not be a total order due to the fact that not every pair of function instances in a confusable set is necessarily itself confusable.

In addition, if Inheritance Order Precedence is used to define function instance specificity, not all confusable functions can be ordered independent of the function invocation. Therefore, in that case, function instances may have "equal" precedence. In this regard, it should be noted that whenever Inheritance Order Precedence is used, the function instances which cannot be statically ordered (i.e., those whose precedence order depends on the actual argument types) are grouped together in the ordering of the confusable set. The members of such a group of function instances which are potentially applicable to a function invocation must be processed specially when selecting the function instance at runtime.

The partial order of the confusable sets can be extended to a total order by a topological sort. To be concrete, a compare function is presented which determines the Global Type Precedence between two confusable function instances. It should be recalled that Global Type Precedence defines a partial order on type such that if A<B, Index(A)<Index(B); and if C is a subtype of D and E, then either Index(D)<Index(E) or Index(E)<Index(D).

```
Order(f_1,f_2) returns Specificity
    Specificity ← Equal
    do ∀i, 1≤i≤f_1.arity while Specificity = Equal
        if f_1.ArgType[i]≠f_2.ArgType[i]
            if Index(f_1.ArgType[i])<Index(f_2.ArgType[i])
                Specificity ← Greater
            else
                Specificity ← Less
```

Next, testing for consistency of confusable function instances will be described. First, it should be recalled that consistency between function instances is required in order to ensure that (1) function instances are distinguishable, and (2) the result type of any function instance which may be called by some function invocation execution is consistent with the invocation context.

The following pseudocode fragment (which may be used to implement the function shown at block 606 of FIG. 6A, i.e., step (e) of the aforesaid preparation process) checks that the members of a confusable set are distinguishable and that their result types conform to their precedence order.

```
CheckConsistency(CS) returns Consistent
    Consistent ← True
    do ∀f_1,f_2 ε CS,f_1≠f_2 while Consistent
        if ∀n, 1≤n≤f_1.arity, ∃T_n≤f_1.ArgType[n]ΛT_n≤f_2.ArgType[n]
            -- f_1 and f_2 are confusable
            if ∄, 1≤i≤f_1.arity, f_1.ArgType[i]≠f_2.ArgType[i]
                -- f_1 and f_2 are indistinguishable
                Consistent ← False
            else
                -- check result type conformance
                Specificity ← Order(f_1,f_2)
                if Specificity = GreaterΛf_1.resType≢f_2.ResType
                    Consistent ← False
                else if Specificity = LessΛf_2.ResType≢f_1.ResType
                    Consistent ← False
                else if f_1.ResType≠f_2.ResType
                    Consistent ← False
```

FIG. 6A includes (a) block 607 to indicate that an error flag should be set if the above-described consistency test fails; and (b) block 608, corresponding to step (f) of the aforesaid preparation process, to indicate that the ordered function instances for each confusable set be stored.

Finally, steps (g)–(h) of the preparation process may now be described with reference to blocks 609 and 610 of FIG. 6A, i.e., the portion of the preparation process used for characterizing a confusable set in such a manner as to help achieve the objectives of the invention.

Given a confusable set, one can characterize the set in such a way as to be able to efficiently determine whether it may contain function instances applicable to a function invocation. To this end, the notion of the top-types of a confusable set is introduced. The top-types of a confusable set define upper bounds for the least specific function instances of the confusable set. If some combination of the top-types of a confusable set are not applicable to a function invocation, then no member of the confusable set is applicable to the invocation. (Note that the converse is not true.) The top-types of a confusable set consist of a set of types for each argument position. The top-types for the i-th argument of a confusable set, tops(i,CS), are the "maximal" types of the i-th formal arguments of members of CS. More formally, $T \in \text{tops}(i,CS)$ iff
$\exists f_m(T_m^1, T_m^2, \ldots, T_m^n) \in CS \wedge T = T_m^i$
and
$\nexists_k(T_k^1, T_k^2, \ldots, T_k^n) \in CS \wedge T < T_k^i$ The following pseudocode fragment illustrates the computation of tops(iCS), the top-types for the i-th argument of function instances of confusable set CS.

```
tops(i,CS) returns TopTypes
    TopTypes ← Λ
    do ∀fcn ∈ CS
        ∀T ∈ TopTypes, if T<fcn.ArgType[i]
            -- T^i replaces its subtypes in TopTypes
            TopTypes ← TopTypes − T + fcn.ArgType[i]
        if ∄T ∈ TopTypes,fcn.ArgType[i]≤T
            -- add T^i to TopTypes when no supertype present
            TopTypes ← TopTypes + fcn.ArgType[i]
```

Next, a process for selecting a confusable set of a function invocation is described with reference to FIG. 6B. In this portion of the description, the details of process steps 1–5 set forth hereinbefore, i.e., the details of the steps performed by type-checking module 102 of FIG. 1, are set forth.

The collective outputs available at the completion of the method depicted in FIG. 6A, i.e., the stored first data structure, ordered function instances for each confusable set, and identified maximal types, are shown in FIG. 1 as inputs to type-checking module 102, together with the source program being compiled.

Given a function invocation fcn($T^1, T^2, \ldots, T^n$), one must determine, at compile time, that the invocation is legal (i.e., there exists at least one applicable function instance) and that all potentially applicable function instances return a result type consistent with the context of the invocation. This is determined at blocks 650–652 of FIG. 6B. It should be noted that any illegal condition detected is shown flagged via blocks 651 and 652 of FIG. 6B.

The aforestated second condition is satisfied if the result type of the most specific applicable function instance is consistent with the context of the invocation and follows from the definition of function instance consistency and function instance precedence as set forth hereinbefore.

The first step is to identify the confusable sets that may contain function instances applicable to the invocation. Given the set of confusable sets (CSets) corresponding to the (overloaded) function instances for function fcn with arity n and the top-types (TOPS[1:n]) for each confusable set, only one of the confusable sets, each of whose top-types contains a supertype of the corresponding static argument type of the invocation, is the confusable set that contains the function instances that may be applicable to the invocation. If no confusable set has top-types which "cover" the static argument types, then there are no function instances applicable to the invocation. (Note that the converse is not true.)

The following pseudocode fragment returns the confusable sets containing function instances which may be applicable to the invocation, or the empty set. If the empty set is returned, there are no applicable function instances.

```
FindCS(CSets,Invocation) returns CS
    CS ← Λ
    do ∀NextCS ∈ CSets
        Eliminated ← False
        do ∀n, 1≤n≤Invocation.arity while ¬Eliminated
            if ∀T ∈ NextCS.Tops[n],Invocation.ArgType[n]≰T
                Eliminated ← True
        if ¬Eliminated
            CS ← CS + NextCS
```

Once the confusable sets "matching" a function invocation have been identified, the compile-time processing of a function invocation must find the most specific applicable function instance (block 653 of FIG. 6B. If the confusable sets are each totally ordered by function instance precedence rules from most specific to least specific, they can be searched in that order to find the first function instance applicable to the invocation in question. (Note, any partial order established by the precedence rules can be extended to a total order by using a topological sort.)

This function instance is the most specific applicable function instance and its result type must be consistent with the context of the function invocation. This is depicted as taking place at blocks 653–658 of FIG. 6 (corresponding to steps (2)–(3) of the aforestated process performed by type-checking module 102).

In addition to validating a function invocation by finding an applicable function instance in the selected confusable set and checking the conformance of the result type, the search for an applicable function instance can also collect all the function instances which are potentially applicable to the invocation. These function instances are exactly those that are examined before finding the first (most specific) applicable function instance that are also confusable with the function invocation.

The following pseudocode fragment illustrates the accumulation of the (ordered) set of potentially applicable function instances given a confusable set ordered by function instance precedence. This code may be used to implement steps (4)–(5) of the aforestated process performed by type-checking module 102 (corresponding to the functions taking place at blocks 659–660 of FIG. 6B). If there are no applicable function instances, the count of potentially applicable functions is set to zero.

```
FindAppl(CS,Invocation) returns <PotAppl[],Count>
    Count ← 0
    foundAppl ← False
    do ∀fcn ∈ CS in precedence order while ¬foundAppl
        -- if fcn is confusable with Invocation
        if ∀n, 1≤n≤Invocation.arity,
            T_n,T_n≤Invocation.ArgType[n]∧
                T_n≤fcn.ArgType[n]
            Count ← Count + 1
```

```
    PotAppl[Count] ← fcn
    -- if fcn is applicable to Invocation
    if ∀n, 1≦n≦Invocation.arity,
       Invocation.ArgType[n]≦fcn.ArgType[n]
         foundAppl ← True
    if -foundAppl
       Count ← 0
```

Finally, a process for selecting the function instance to be executed is set forth hereinafter.

The potentially applicable function instances (PotAppl) derived in the previous step during program compilation (provided by the method shown in FIG. 6B via, for example, the second data structure) are used during program execution to select the function instance to be executed. However, instead of using the static argument types of the function invocation, the types of the actual arguments of the invocation are used to select the most specific applicable function instance. It is the most specific function instance of the potentially applicable function instances, relative to the actual argument types, that is called and executed at runtime.

The following pseudocode fragment illustrates the selection of the function instance to be executed. This pseudocode assumes that some "global" precedence order is used and, therefore, the first applicable function instance encountered is the function instance to be executed.

```
Dispatch(PotAppl,Invocation) returns fcn
    fcn ← 0
    do ∀i, 1≦i≦maxfcns while fcn = 0
    -- if next PotAppl is applicable
    if ∀n, 1≦n≦Invocation.arity, Invocation.ActArgType[n]≦
       PotAppl[i].ArgType[n]
          fcn ← PotAppl[i]
```

If Inheritance Order Precedence is used, groups of function instances with equal static precedence must be processed specially. It should be noted that equal static precedence occurs when the formal argument types at the first differing argument position are not in a subtype relationship. The function precedence, in that case, depends on the (user defined) inheritance order of the actual argument type.

If the first applicable function instance of the vector of potentially applicable function instances is followed by one or more potentially applicable function instances of equal static precedence, then the search for the most specific applicable function instance must continue. The following pseudocode indicates how the search continues to select the most specific of the group of function instances with statically equal precedence.

```
DispatchIOP(PotAppl,Invocation) returns fcn
    fcn ← 0
    do ∀i, 1≦i≦maxfcns while fcn = 0
    -- if next PotAppl is applicable
    if ∀n, 1≦n≦Invocation.arity, Invocation.ActArgType[n]≦
       PotAppl[i].ArgType[n]
          fcn ← PotAppl[i]
    -- search 'equal' specificity group for better match
    do ∀k, i+1≦k≦maxfcns while Order(fcn,PotAppl[k]) =
    Equal
       if ∀n, 1≦n≦Invocation.arity, Invocation.ActArgType[n]≦
          PotAppl[k].ArgType[n]
             -- PotAppl[k] is applicable and of Equal specificity
             -- check if PotAppl[k] more specific than fcn with respect to
                invocation
                Done ← False
```

```
    do ∀j, 1<j<Invocation.arity while ]Done
       if fcn.ArgType[j]≠PotAppl[k].ArgType[j]
          -- found 1st differing argument position
          Done ← True
          if Invocation.ActArgType[j] inherits
             PotAppl[k].ArgType[j] before
                fcn.ArgType[j]fcn.ArgType[j]
                   -- PotAppl[k] more specific with respect to Invocation
                   fcn ← PotAppl[k]
```

It should be noted that there are a number of optimizations and extensions of the above-described methods contemplated by the invention.

If the partial order over types induced by the subtype relationship is extended to a total order, then each type can be assigned an index, denoted $I_T$, such that $T_1 < T_2 => I_{T1} < I_{T2}$. Given these type indexes, each function instance can be assigned an index equal to the maximum of the type indexes of its arguments, and each function invocation can be assigned an index equal to the minimum of the type indexes of its (static or actual) arguments. If the index of a function instance is less than the index of a function invocation, then the instance is not applicable to the invocation.

The order in which argument positions are checked for applicability during the search for the most specific applicable function (during compilation or execution) can be optimized to first test the positions most likely to disqualify the function instance or to disqualify the most function instances. In the first case, argument positions whose formal types differ for adjacent function instances in the function precedence order should be checked earlier. Checking argument positions whose formal types are the same for adjacent functions can eliminate more than one function at once. Decision table optimization techniques can also be applied to optimize the type comparisons when testing for applicability of function instances.

The consistency rules between confusable functions (i.e, result types must conform to function precedence order) can be relaxed. For example, instead of statically ensuring that more specific function instances have more specific result types, the compatibility of the function instance result type with the expected result type can be made part of the criteria for function instance applicability. This and other restrictions on applicability can be applied at compile and runtime to extend the semantics of function instance selection.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

For example, systems which support incremental type and function instance definitions and accordingly allow for modification of the outputs of the aforementioned preparation process, are systems in which it is contemplated that the invention may be utilized.

The embodiments and examples set forth herein were presented in order to best explain the principles of the instant invention and its practical application to thereby enable others skilled in the art to best utilize the instant invention in various embodiments and with various modifications as are suited to the particular use contemplated.

What is claimed is:

1. A method, to be practiced at compile time by a data handling system that supports multimethod function selection on typed data, including subtypes with multiple inheritance, for enabling static-type checking to be performed at run time for overloaded functions, wherein said system includes (i) a set of type definitions, including specification of subtype relationships, (ii) function definitions referring to at least one of the type definitions, each function definition including a definition of arguments, including an argument order and argument positions, and (iii) precedence rules which, in combination with the function argument order, define an ordering of the confusable function instances, for a given set of arguments, the method comprising the steps of:

(a) creating from said type definitions a first data structure for representing subtype relationships between data types, the subtype relationships including levels of specificity, such that, within a given subtype relation for a given set of the data types, there is a maximal static argument type which has a lowest level of specificity;

(b) creating from said first data structure and said function definitions a partitioning of function instances into confusable sets;

(c) ordering the function instances within each confusable set;

(d) verifying consistency among the ordered function instances resulting from said step of ordering;

(e) identifying any consistency errors with respect to said ordered function instances;

(f) signaling an error condition upon the identification of any such consistency error;

(g) extracting, for each confusable set, information as the maximal static argument types of the functions are for each of the argument positions; and identifying confusable sets of function instances as confusable sets which potentially contain all functions applicable to the function invocation, the applicable functions having arguments, the arguments having argument types which are supertypes or subtypes of the compile time argument types of the function invocation;

whereby, one of the applicable functions is chosen for execution at run time, in accordance with actual types of the function arguments.

2. A method as set forth in claim 1, further comprising the step of storing said first data structure, the ordered function instances for each confusable set, and the extracted maximal type information.

3. A method as set forth in claim 1, further comprising the step of providing said first data structure, the ordered function instances for each confusable set, and the extracted maximal type information to a compile-time type checking module wherein said static-type checking for overloaded functions in said data handling system may be performed.

4. A method, to be practiced at compile time by a data handling system that supports multimethod function selection on typed data, including subtypes with multiple inheritance, for enabling static-type checking to be performed at run time for overloaded functions, wherein said system includes (i) a set of type definitions, including specification of subtype relationships, (ii) function definitions referring to at least one of the type definitions, and (iii) precedence rules which, in combination with the function argument order, define an ordering of the confusable function instances, for a given set of arguments, and further wherein said system includes a first data structure for representing (i) subtype relationships as specified in said type definitions, the subtype relationships including levels of specificity, such that, within a given subtype relation for a given set of the data types, there is a maximal static argument type which has a lowest level of specificity, (ii) a partitioning of function instances into confusable sets within which the function instances are ordered, and (iii) for each confusable set, information as to what the maximal static argument types of the functions are for each of the argument positions, the method comprising the steps of:

(a) inputting a source program to said system;

(b) selecting confusable sets that are potentially associated with a function invocation in said source program based on said maximal static argument information;

(c) determining from the confusable sets selected, via said step of selecting, the most specific applicable function instance for the static argument types of the function invocation;

(d) checking that the result type of said most specific applicable function instance is consistent with the static invocation context in which it occurs;

(e) identifying any consistency errors with respect to said most specific applicable function instance;

(f) signaling an error condition upon the identification of any most specific applicable function instance consistency error;

(g) identifying function instances from the confusable sets, the identified function instances having actual argument types such that the argument types of the identified function instances and the function invocation have subtype relationships so as to allow the identified function instances to be called from the function invocation;

(h) creating a second data structure for the function instances identified in the said step of identifying which may be utilized at the time of program execution to facilitate dynamic selection of the most specific applicable function instance for the types of all the actual arguments of the invocation; and (i) identifying confusable sets of function instances as confusable sets which potentially contain all functions applicable to the function invocation, the applicable functions having arguments, the arguments having argument types which are supertypes or subtypes of the compile time argument types of the function invocation;

whereby, one of the applicable functions is chosen for execution at run time, in accordance with actual types of the function arguments.

5. A method, to be practiced at compile time by a data handling system that supports multimethod function selection on typed data, including subtypes with multiple inheritance, for enabling static-type checking to be performed at run time for overloaded functions, wherein said system includes (i) a set of type definitions, including specification of subtype relationships, (ii) function definitions referring to at least one of the type definitions, and (iii) precedence rules which, in combination with the function argument order, define an ordering of the confusable function instances, for a given set of arguments, the method comprising the steps of:

(a) creating from said type definitions a first data structure for representing subtype relationships between data types, the subtype relationships including levels of specificity, such that, within a given subtype relation for a given set of the data types, there is a maximal static argument type which has a lowest level of specificity;

(b) creating from said first data structure and said function definitions a partitioning of function instances into confusable sets;

(c) ordering the function instances within each confusable set;

(d) verifying consistency among the ordered function instances resulting from said step of ordering;

(e) identifying any consistency errors with respect to said ordered function instances;

(f) signaling an error condition upon the identification of any such consistency error;

(g) extracting, for each confusable set, information as to what the maximal static argument types of the functions are for each of the argument positions;

(h) inputting a program to said data handling system;

(i) selecting confusable sets that are potentially associated with a function invocation in said program based on said maximal static argument information;

(j) determining from the confusable sets selected, via said step of selecting, the most specific applicable function instance for the static argument types of the function invocation;

(k) checking that the result type of said most specific applicable function instance is consistent with the static invocation context in which it occurs;

(l) identifying any consistency errors with respect to said most specific applicable function instance;

(m) signaling an error condition upon the identification of any most specific applicable function instance consistency error;

(n) identifying function instances from the confusable sets, the identified function instances having actual argument types such that the argument types of the identified function instances and the function invocation have subtype relationships so as to allow the identified function instances to be called from the function invocation;

(o) creating a second data structure for the function instances identified in the said step of identifying which may be utilized at the time of program execution to facilitate dynamic selection of the most specific applicable function instance for the types of all the actual arguments of the invocation; and (p) identifying confusable sets of function instances as confusable sets which potentially contain all functions applicable to the function invocation, the applicable functions having arguments, the arguments having argument types which are supertypes or subtypes of the compile time argument types of the function invocation;

whereby, one of the applicable functions is chosen for execution at run time, in accordance with actual types of the function arguments.

6. A method as set forth in claim 5, further comprising the step of selecting the most specific applicable function instance for the types of all the actual arguments of a function invocation and executing that function instance.

7. A method as set forth in claim 6, further comprising the step of utilizing a function precedence order to refine the search for applicable function instances among the potentially applicable function instances at runtime.

8. A data handling system that supports multimethod function selection on typed data, including subtypes with multiple inheritance, for enabling static-type checking to be performed at run time for overloaded functions, the system comprising:

a set of type definitions, including specification of subtype relationships;

function definitions referring to at least one of the type definitions, each function definition including a definition of arguments, including an argument order and argument positions;

precedence rules which, in combination with the function argument order, define an ordering of the confusable function instances, for a given set of arguments;

means, operable at compile time, for creating from said type definitions a first data structure for representing subtype relationships between data types, the subtype relationships including levels of specificity, such that, within a given subtype relation for a given set of the data types, there is a maximal static argument type which has a lowest level of specificity;

means, operable at compile time, for creating from said first data structure and said function definitions a partitioning of function instances into confusable sets;

means, operable at compile time, for ordering the function instances within each confusable set;

means, operable at compile time, for creating from said first data structure and said verifying consistency among the ordered function instances resulting from said step of ordering;

means, operable at compile time, for creating from said first data structure and said identifying any consistency errors with respect to said ordered function instances;

means, operable at compile time, for signaling an error condition upon the identification of any such consistency error;

means, operable at compile time, for extracting, for each confusable set, information as to what the maximal static argument types of the functions are for each of the argument positions;

means, operable at compile time, for identifying confusable sets of function instances as confusable sets which potentially contain all functions applicable to the function invocation, the applicable functions having arguments, the arguments having argument types which are supertypes or subtypes of the compile time argument types of the function invocation; and means, operable at run time, for choosing one of the applicable functions for execution, in accordance with actual types of the function arguments.

9. A data handling system that supports multimethod function selection on typed data, including subtypes with multiple inheritance, for enabling static-type checking to be performed at run time for overloaded functions, the system comprising:

a set of type definitions, including specification of subtype relationships;

function definitions referring to at least one of the type definitions;

precedence rules which, in combination with the function argument order, define an ordering of the confusable function instances, for a given set of arguments, and further wherein said system includes a first data structure for representing (i) subtype relationships as specified in said type definitions, the subtype relationships including levels of specificity, such that, within a given subtype relation for a given set of the data types, there is a maximal static argument type which has a lowest level of specificity, (ii) a partitioning of function instances into confusable sets within which the function instances are ordered, and (iii) for each confusable set, information as to what the maximal static argument types of the functions are for each of the argument positions, the system comprising:

means, operable at compile time, for inputting a source program to said system;

means, operable at compile time, for selecting confusable sets that are potentially associated with a function invocation in said source program based on said maximal static argument information;

means, operable at compile time, for determining from the confusable sets selected, via said step of selecting, the most specific applicable function instance for the static argument types of the function invocation;

means, operable at compile time, for checking that the result type of said most specific applicable function instance is consistent with the static invocation context in which it occurs;

means, operable at compile time, for identifying any consistency errors with respect to said most specific applicable function instance;

means, operable at compile time, for signaling an error condition upon the identification of any most specific applicable function instance consistency error;

means, operable at compile time, for identifying function instances from the confusable sets, the identified function instances having actual argument types such that the argument types of the identified function instances and the function invocation have subtype relationships so as to allow the identified function instances to be called from the function invocation;

means, operable at compile time, for creating a second data structure for the function instances identified by the means for identifying which may be utilized at the time of program execution to facilitate dynamic selection of the most specific applicable function instance for the types of all the actual arguments of the invocation;

means, operable at compile time, for identifying confusable sets of function instances as confusable sets which potentially contain all functions applicable to the function invocation, the applicable functions having arguments, the arguments having argument types which are supertypes or subtypes of the compile time argument types of the function invocation; and means, operable at run time, for choosing one of the applicable functions for execution, in accordance with actual types of the function arguments.

10. A data handling system that supports multimethod function selection on typed data, including subtypes with multiple inheritance, for enabling static-type checking to be performed at run time for overloaded functions, the system comprising:

a set of type definitions, including specification of subtype relationships, function definitions referring to at least one of the type definitions, precedence rules which, in combination with the function argument order, define an ordering of the confusable function instances, for a given set of arguments, means, operable at compile time, for creating from said type definitions a first data structure for representing subtype relationships between data types, the subtype relationships including levels of specificity, such that, within a given subtype relation for a given set of the data types, there is a maximal static argument type which has a lowest level of specificity;

means, operable at compile time, for creating from said first data structure and said function definitions a partitioning of function instances into confusable sets;

means, operable at compile time, for ordering the function instances within each confusable set;

means, operable at compile time, for verifying consistency among the ordered function instances resulting from said step of ordering;

means, operable at compile time, for identifying any consistency errors with respect to said ordered function instances;

means, operable at compile time, for signaling an error condition upon the identification of any such consistency error;

means, operable at compile time, for extracting, for each confusable set, information as to what the maximal static argument types of the functions are for each of the argument positions;

means, operable at compile time, for inputting a program to said data handling system;

means, operable at compile time, for selecting confusable sets that are potentially associated with a function invocation in said program based on said maximal static argument information;

means, operable at compile time, for determining from the confusable sets selected, via said step of selecting, the most specific applicable function instance for the static argument types of the function invocation;

means, operable at compile time, for checking that the result type of said most specific applicable function instance is consistent with the static invocation context in which it occurs;

means, operable at compile time, for identifying any consistency errors with respect to said most specific applicable function instance;

means, operable at compile time, for signaling an error condition upon the identification of any most specific applicable function instance consistency error;

means, operable at compile time, for identifying function instances from the confusable sets, the identified function instances having actual argument types such that the argument types of the identified function instances and the function invocation have subtype relationships so as to allow the identified function instances to be called from the function invocation;

means, operable at compile time, for creating a second data structure for the function instances identified by the means for identifying which may be utilized at the time of program execution to facilitate dynamic selection of the most specific applicable function instance for the types of all the actual arguments of the invocation;

means, operable at compile time, for identifying confusable sets of function instances as confusable sets which potentially contain all functions applicable to the function invocation, the applicable functions having arguments, the arguments having argument types which are supertypes or subtypes of the compile time argument types of the function invocation; and means, operable at compile time, for choosing one of the applicable functions for execution, in accordance with actual types of the function arguments.

* * * * *